United States Patent [19]

Geis

[11] 3,858,675
[45] Jan. 7, 1975

[54] SELF-PROPELLED VEHICLE HAVING COMBINED DIRECTIONAL AND ACCELERATION PEDAL CONTROL

[75] Inventor: Warren P. Geis, Port Washington, Wis.

[73] Assignee: Koehring Company, Milwaukee, Wis.

[22] Filed: June 11, 1973

[21] Appl. No.: 369,010

[52] U.S. Cl. ............... 180/66 R, 74/478, 180/77 R, 214/778
[51] Int. Cl. ............................................. B60k 17/10
[58] Field of Search ......... 180/66 R, 77 R; 214/140, 214/778; 74/513, 474, 478

[56] References Cited
UNITED STATES PATENTS

| | | | |
|---|---|---|---|
| 3,005,562 | 10/1961 | Shaffer | 180/66 R X |
| 3,078,656 | 2/1963 | Jedrzykowski | 180/66 R |
| 3,369,360 | 2/1968 | DeBiasi | 180/66 R X |
| 3,450,224 | 6/1969 | Griesenbrock | 180/66 R |
| 3,454,176 | 7/1969 | Landeborg et al. | 214/778 |
| 3,461,669 | 8/1969 | Kanengieter | 180/66 R X |
| 3,635,365 | 1/1972 | Bauer | 214/778 |
| 3,691,863 | 9/1972 | Shaffer | 74/478 |
| 3,734,224 | 5/1973 | Franklin | 180/66 R |

*Primary Examiner*—David Schonberg
*Assistant Examiner*—David M. Mitchell
*Attorney, Agent, or Firm*—Andrew J. Beck

[57] ABSTRACT

A self-propelled vehicle, such as an end loader or forklift truck, comprises ground wheels drivable in forward or reverse direction at variable speed by hydraulic motors. The motors are supplied with fluid from at least one variable displacement reversible output hydraulic pump which has an adjustably movable swash plate for controlling motor direction and speed. The pump is driven by an internal combustion engine having a throttle for regulating engine (and therefore pump) speed. A shuttle pedal located in the vehicle operator's cab is connected to the pump swash plate and to the engine throttle. The shuttle pedal is pivotably movable in opposite directions to control the direction of vehicle movement and is depressible to a desired degree in the selected direction to regulate vehicle speed in the chosen direction. In one preferred embodiment of the invention at least one additional engine driven auxiliary pump is provided to supply fluid to hydraulic actuators which operate other components on the vehicle and an independently usable throttle pedal is provided for regulating engine speed when the hydraulic actuators are in use. The throttle pedal and the shuttle pedal are independently usable but are connected to the engine throttle through a common linkage.

4 Claims, 12 Drawing Figures

SELF-PROPELLED VEHICLE HAVING COMBINED DIRECTIONAL AND ACCELERATION PEDAL CONTROL

BACKGROUND OF THE INVENTION

1. Field of Use

This invention relates generally to self-propelled vehicles, such as end loaders or forklift trucks, which are propelled and operated by engine-driven hydraulic pumps and hydraulic motors. In particular, the invention relates to such a vehicle wherein control pedals are employed to control or regulate vehicle direction and speed and other vehicle functions.

2. Description of the Prior Art

Some self-propelled vehicles, such as end loaders or forklift trucks, are propelled and operated by engine-driven hydraulic pumps and hydraulic motors. For example, in some such machines the ground wheels are drivable in either forward or reverse directions at variable speeds by hydraulic motors. The motors are supplied with fluid from at least one variable displacement reversible output hydraulic pump which has an adjustably movable swash plate for controlling motor direction and speed. Usually, one or more engine-driven auxiliary pumps are also provided to supply operating fluid to hydraulic actuators, such as cylinders, which operate other movable components on the vehicle, such as booms or the like. Typically, all of the pumps are driven by an internal combustion engine having a throttle for regulating engine speed (and, therefore, pump speed). In some such prior art vehicles, two independently usable control pedals were provided for controlling vehicle direction and each of these pedals was depressible to regulate vehicle speed in the chosen direction. In addition, a third independently usable pedal was provided solely for the purpose of regulating engine speed when the auxiliary pump was being called upon to supply fluid to the component actuators. Ordinarily, the third pedal was actuable by the operator's left foot and the two other pedals were actuable alternately by his right foot. Such an arrangement introduced a possibility of error is selection of the correct foot pedal to achieve vehicle movement in the desired direction, particularly if the operator was distracted by other duties or fatigued.

SUMMARY OF THE PRESENT INVENTION

A self-propelled vehicle, such as an end loader or forklift truck, comprises ground wheels drivable in forward or reverse direction at variable speed by hydraulic motors. The motors are supplied with fluid from at least one variable displacement reversible output hydraulic pump which has an adjustably movable swash plate for controlling motor direction and speed. The pump is driven by an internal combustion engine having a throttle for regulating engine (and, therefore, pump) speed. A shuttle pedal located in the vehicle operator's cab is connected to the pump swash plate and to the engine throttle. The shuttle pedal is pivotably movable in opposite directions to control the direction of vehicle movement and is depressible to a desired degree in the selected direction to regulate vehicle speed in the chosen direction. In one preferred embodiment of the invention at least one additional engine driven auxiliary pump is provided to supply fluid to hydraulic actuators which operate other components on the vehicle and an independently usable throttle pedal is provided for regulating engine speed when the hydraulic actuators are in use. The throttle pedal and the shuttle pedal are independently usable but are connected to the engine throttle through a common linkage.

More specifically, the throttle pedal and shuttle pedal are pivotably mounted on the floorboard of the operator's cab so as to be accessible, for example, to the operator's left and right foot, respectively. The throttle pedal is depressible in one direction only, whereas the shuttle pedal is tiltable or depressible in seesaw fashion in two directions by applying pressure at opposite ends. The shuttle pedal has a lever arm at the center thereof which extends downwardly below the floorboard and connects to one end of an axially movable pump control cable. The other end of the pump control cable connects to a pump operating linkage for operating the pump swash plates. Movement of the shuttle pedal in either direction effects corresponding movement of the swash plates.

A cylindrical pivot shaft is rotatably mounted beneath the floorboard and has a bell crank rigidly attached at one end which is connected to operate a spring-loaded engine throttle crank. The engine throttle crank connects to one end of an axially movable throttle control cable. The other end of the throttle control cable connects to the engine throttle control lever. The throttle pedal is connected by a rod to the bell crank on the shaft. The right and left sides of the shuttle pedal are connected by rods to right and left pivot assemblies, respectively, which are rotatably mounted on the shaft on opposite sides of a radially projecting stop member rigidly secured thereon. Each pivot assembly has a projection thereon which is releasably engageable with the member on the shaft. When the shuttle pedal is depressed in one direction, the corresponding pivot assembly is rotated on the shaft until the projection thereon engages the stop member on the shaft and causes rotation of the shaft, thereby effecting operation of the engine throttle. When the shuttle pedal is released, and spring biasing forces acting on the shaft through the bell crank, rotate the shaft back to its original position. As the shaft returns, the stop member thereon engages the appropriate pivot assembly and returns it and the shuttle pedal to the original position. Thus, rotation of the shaft or a result of operation of the throttle pedal or operation of the shuttle pedal in either direction effects corresponding movement of the engine throttle control lever.

In a preferred embodiment of the invention, two variable displacement swash plate type pumps are provided, one for supplying fluid to the vehicle rear wheel motors and the other for the front wheel motors. Accordingly, a pump operating linkage is provided for operating the swash plate control levers for the two pumps which are mounted on the front end of the vehicle engine in upside down relationship with respect to each other. This linkage comprises a horizontally disposed rotatably shaft mounted ahead of and transverse to the engine, a first lever arm on one end of the shaft connected to the pump control cable, a second lever arm on the said one end of the shaft connected to the upper pump swash plate control lever, and a third lever arm on the opposite end of the shaft connected to one end of a vertically disposed spring-loaded tie rod which has its other end connected to the lower pump swash plate control lever.

A vehicle having pedal control means in accordance with the invention is more easily and more reliably operated than comparable vehicles having several discrete pedals for controlling vehicle direction and speed. Furthermore, the shuttle pedal control in accordance with the invention enables the vehicle operator to effect changes in vehicle direction and speed without lifting his foot from the shuttle pedal, or by placing his foot in the centrally disposed V-shaped depression thereof and rocking his foot in the desired direction and to the desired degree. Also, the shuttle pedal control and its associated pump control linkage afford an improved means for simultaneously controlling two separate swash plate type variable displacement pumps. Other objects and advantages of the invention will hereinafter appear.

DESCRIPTION OF A PREFERRED EMBODIMENT

GENERAL ARRANGEMENT

Figures 1, 2:
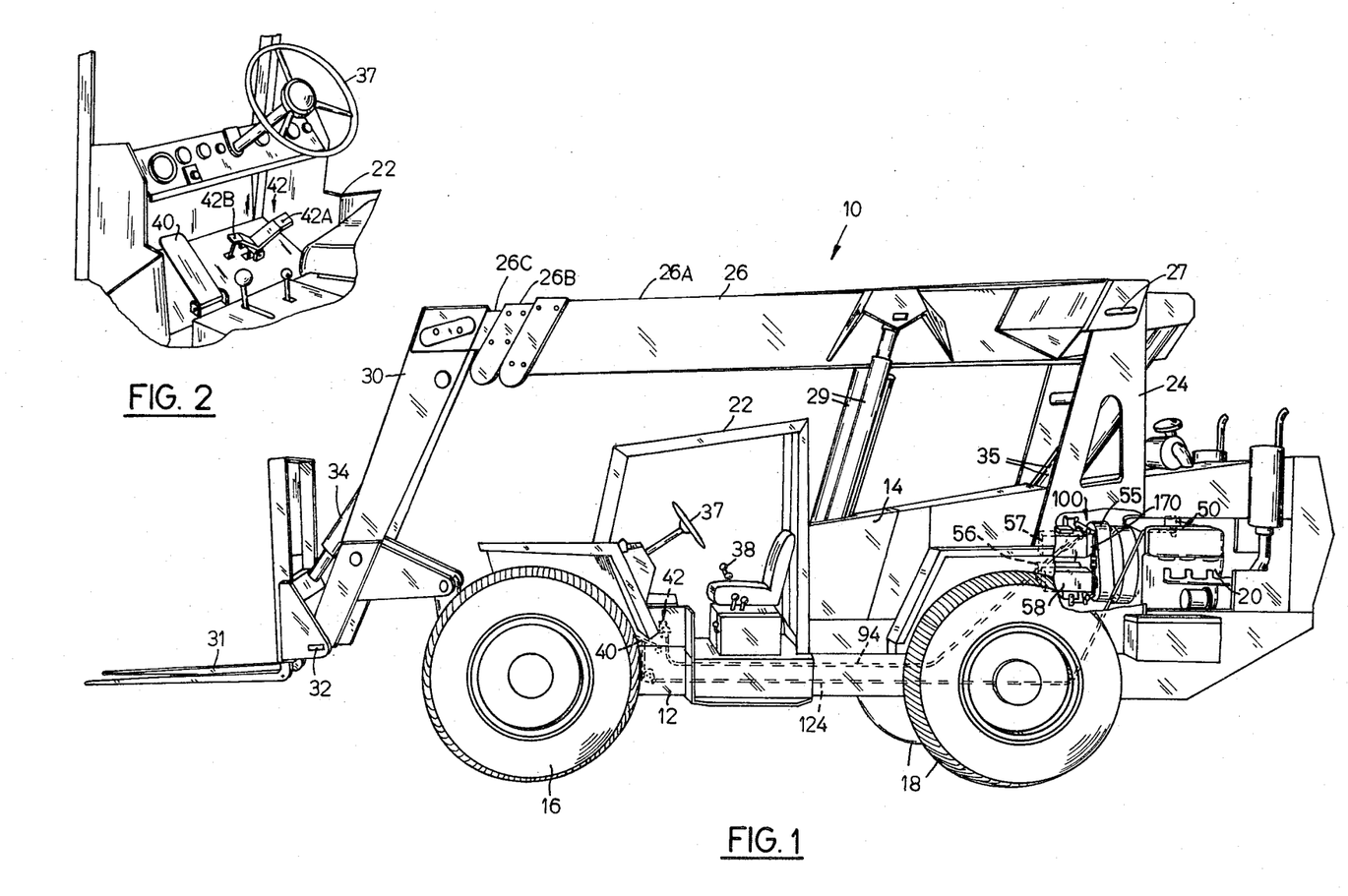
FIG. 1 is a perspective view of the left side of a self-propelled vehicle, such as a forklift truck or end loader, having throttle and shuttle pedal controls in accordance with the invention.
FIG. 2 is a perspective view of a portion of the interior of the operator's cab of the vehicle of FIG. 1 showing pedal controls in accordance with the invention.
Figure 3:
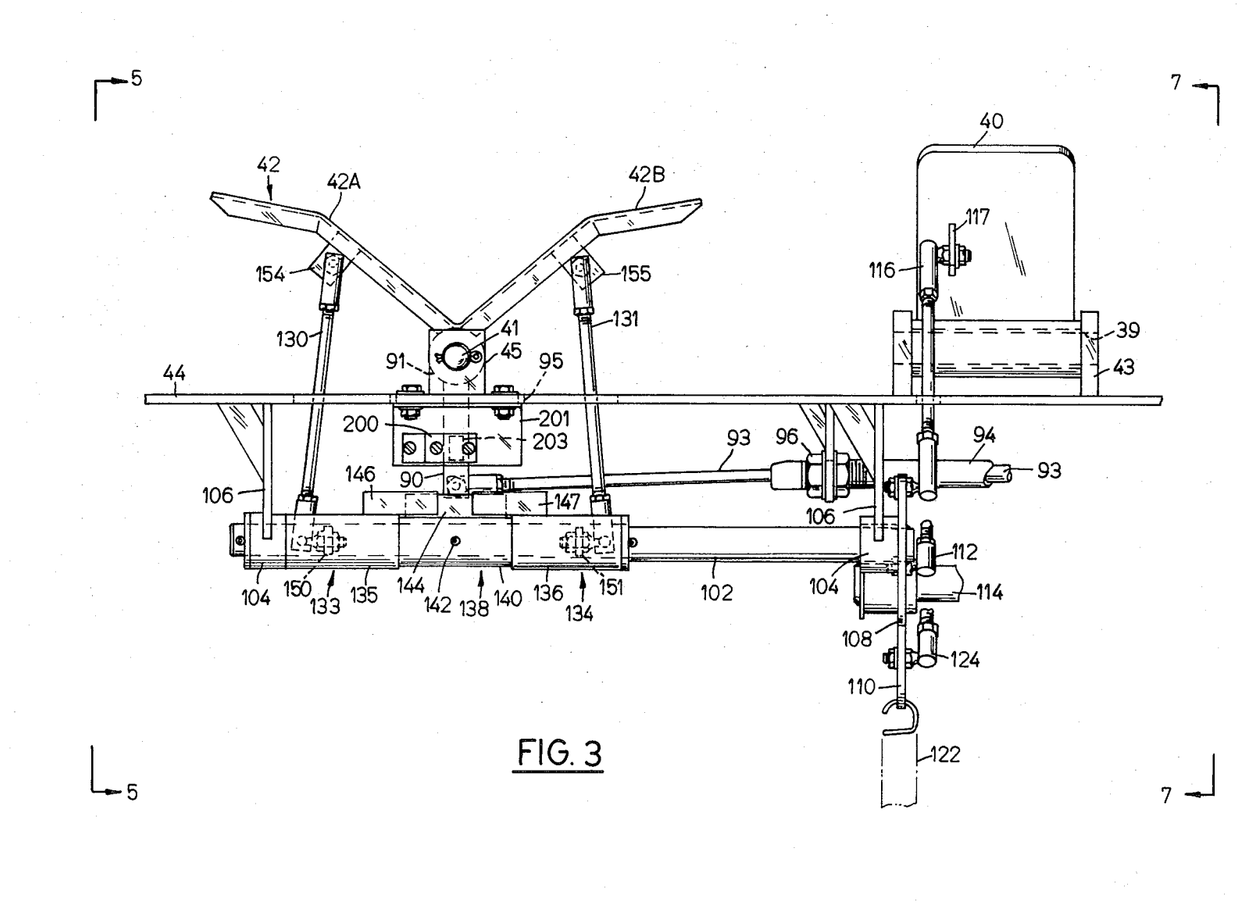
FIG. 3 is an enlarged front elevation view of the pedal controls shown generally in FIG. 1.
Figure 4:
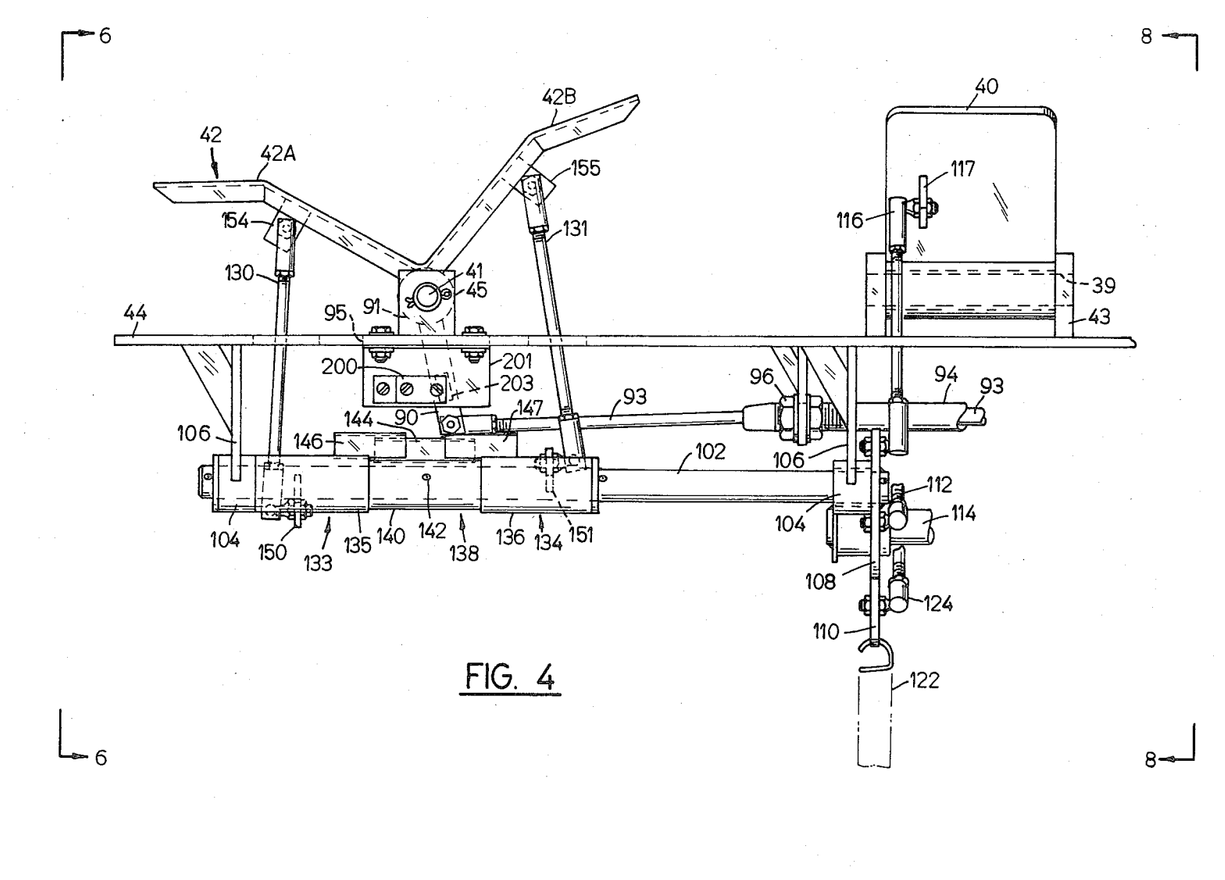
FIG. 4 is a view similar to FIG. 3 but showing the shuttle pedal depressed to the right side of the vehicle.
Figure 5:
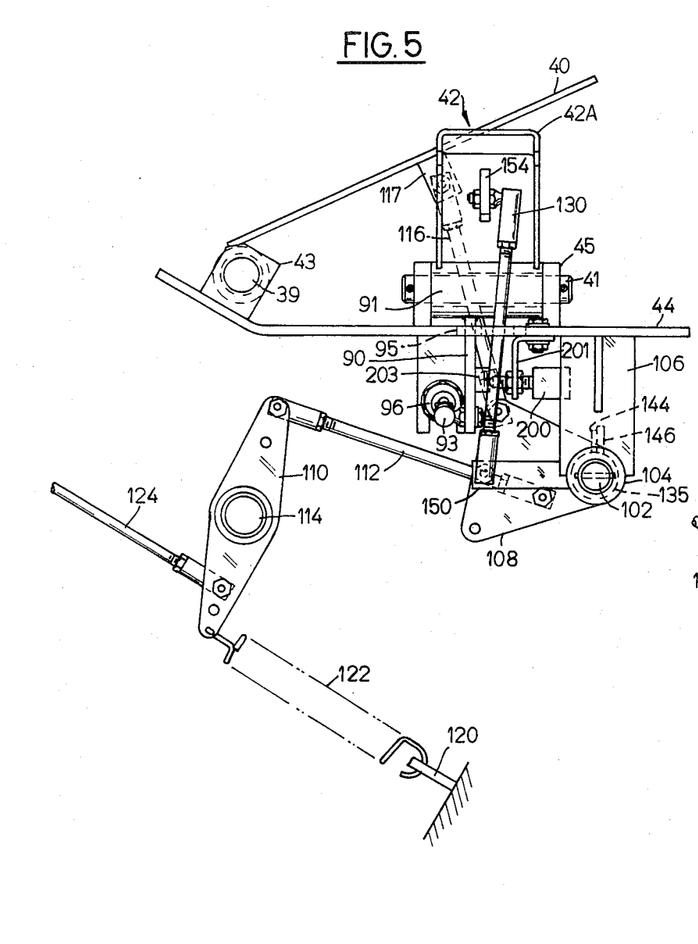
FIG. 5 is a view of the right side of the pedal controls taken on line 5—5 of FIG. 3.
Figure 6:
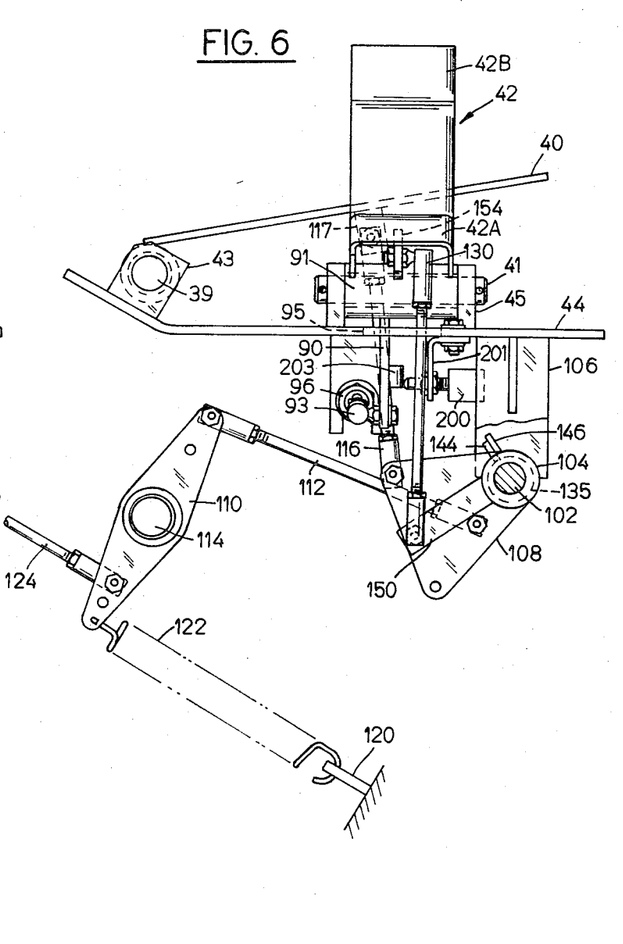
FIG. 6 is a view similar to FIG. 5 but taken on line 6—6 of FIG. 4 and showing the right side of the shuttle pedal depressed.
Figure 7:
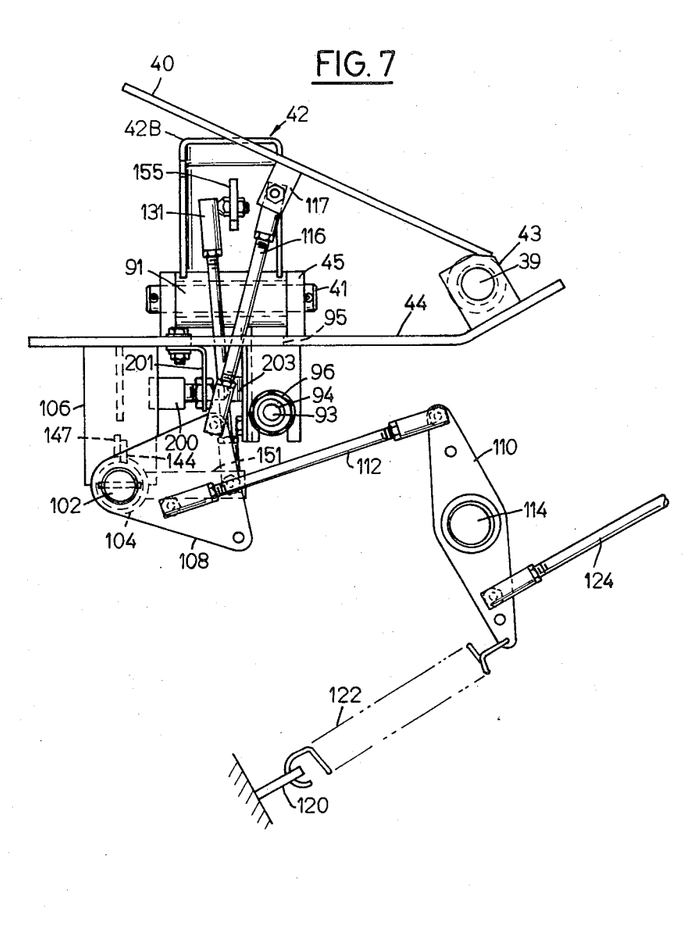
FIG. 7 is a view of the left side of the controls taken on line 7—7 of FIG. 3.
Figure 8:
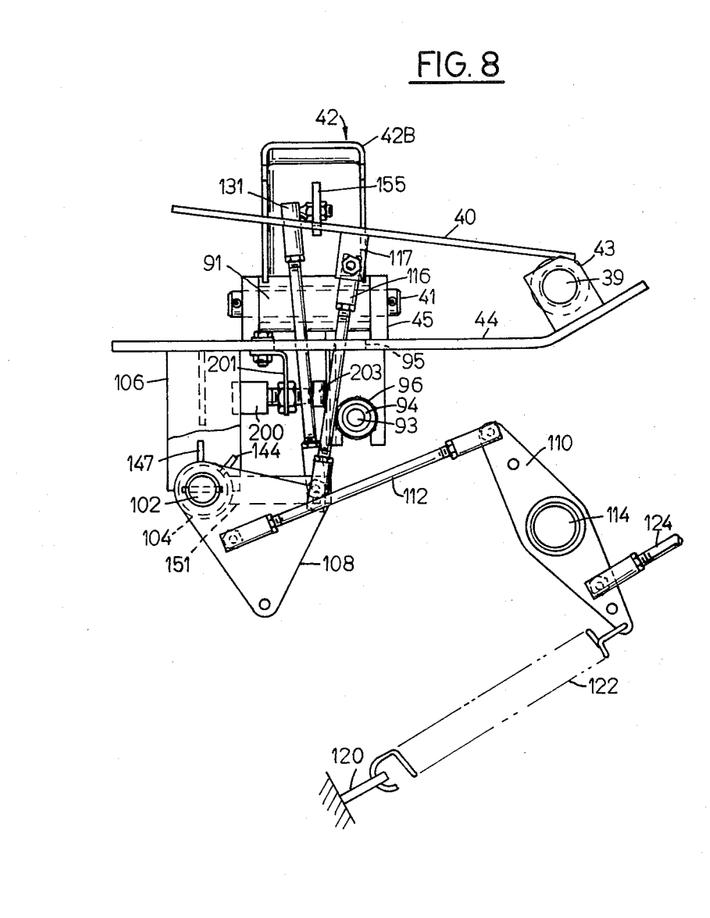
FIG. 8 is a view similar to FIG. 7 but showing the throttle pedal depressed.

Referring to FIG. 1, the numeral 10 designates a self-propelled material handling vehicle, such as a heavy-duty hydraulically operated forklift truck, in accordance with the present invention. Vehicle 10 comprises a lower unit or chassis 12 on which an upper unit or body 14 is mounted. Body 14 is tiltable to a limited degree in opposite directions with respect to chassis 12 for leveling purposes, as when operating on rough terrain, as described in U.S. Patent Application Ser. No. 193,807, filed Oct. 29, 1971, and now abandoned, by Warren P. Geis et al., and entitled "Vehicle Having Transverse Leveling Means."

Chassis 12 is provided with a pair of hydraulically driven and hydraulically steerable rubber-tired front ground wheels 16 and a pair of hydraulically driven and hydraulically steerable rubber-tired rear ground wheels 18. An internal combustion engine 20, such as a gasoline or deisel engine, is mounted at the rear of chassis 12 and an operator's cab 22 is located near the forward end of the chassis.

Body 14 is provided with an upright frame 24 near the rear thereof on which a multisection telescopic boom 26 is mounted, as at 27, for pivotal or swingable movement in a vertical direction. Boom 26 is vertically swingable by means of a pair of large extendable and retractable hydraulic lift cylinders 29 connected between the boom and body 14. Boom 26 comprises a hollow base section 26A, a hollow intermediate section 26B telescopable within the base section, and an outermost end section 26C telescopable within the intermediate section. Sections 26B and 26C are telescopicably movable by means of hydraulic cylinder 28, shown in FIG. 12, and understood to be located within boom 26. End section 26C has a generally downwardly extending frame 30 rigidly secured thereto. A load carrying L-shaped fork 31 is pivotally mounted, as at 32, to the free end of frame 30 and is angularly adjustable relative thereto by means of a pair of hydraulic slave cylinders 34 connected between the fork and the frame. Fork 31 is automatically maintained level as boom 26 moves vertically due to the fact that the slave cylinders 34 are actuated by a pair of tilt cylinders 35 connected between the rear end of boom 26 and body 14 and responsive to boom movement.

Manually operable controls are located in cab 22 and comprise a steering wheel 37 for vehicle 10 and various control levers, such as 38, for controlling functions of boom 26. As FIG. 2 shows, a foot-operated throttle pedal 40 and a foot operated shuttle pedal 42 are mounted on the floorboard 44 in cab 22. As hereinafter described in detail, throttle pedal 40 is operated by the left foot of the vehicle operator and is used to regulate the speed of engine 20 when, for example, load lifting components, such as hydraulically operable boom 26 or the hydraulically operable steering mechanism, are being utilized. Shuttle pedal 42 is selectively operated in opposite directions by the right foot of the vehicle operator and is used to control the forward and reverse direction of travel of vehicle 10 and ground speed in the selected direction.

THE HYDRAULIC SYSTEM

Figure 9:
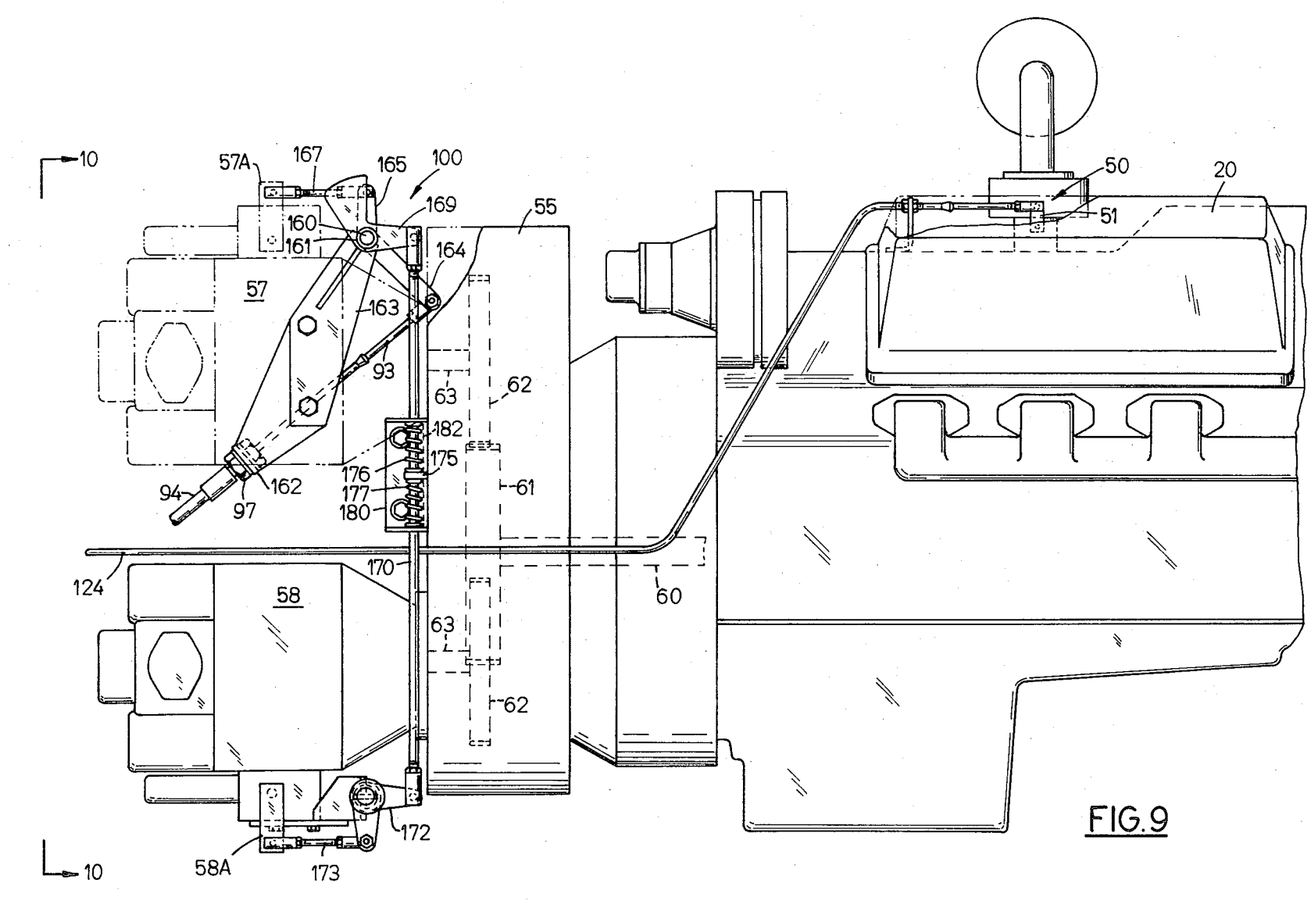
FIG. 9 is an enlarged elevation view, partly in phantom, of the left side of the engine, pumps and pump control linkage shown in FIG. 1.

Referring generally to FIGS. 1, 9, 10, 11 and 12, engine 20 is provided with a throttle 50 having a throttle control lever 51, shown in FIG. 9, which is pivotably movable between an engine idle position wherein it is shown, and a rearward position. It is to be understood that engine 20 is continuously in operation when vehicle 10 is in use and movement of lever 51 away from the idle position effects an increase in engine speed, whereas movement back toward idle position effects a decrease in engine speed.

Figure 10:
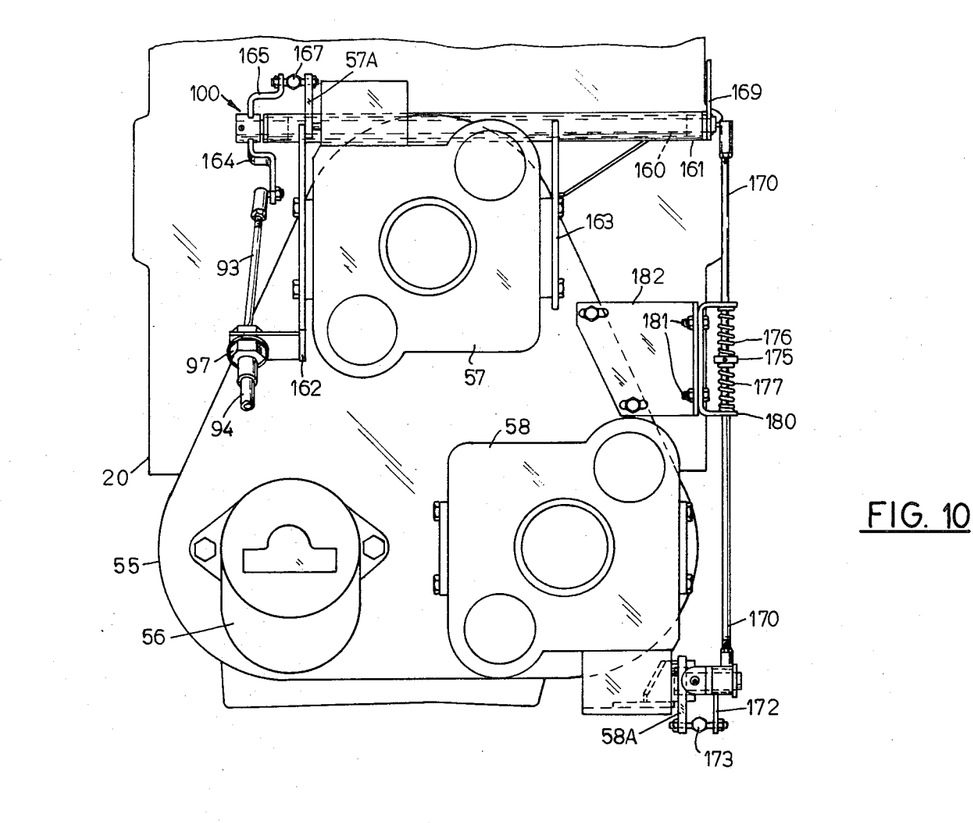
FIG. 10 is a view taken on line 10—10 of FIG. 9.

Engine 20 is provided at its front end, as FIGS. 1, 9 and 10 show, with a pump drive housing 55 on which three hydraulic pumps 56, 57 and 58 are mounted. As FIG. 9 shows, engine 20 has an output shaft 60 with a drive gear 61 thereon which is in constant mesh with gears 62 which are provided on the shafts 63 of each of the three pumps. Thus, the three pumps are continuously driven by engine 20 and all pumps change speed in response to change in engine speed.

Figure 12:
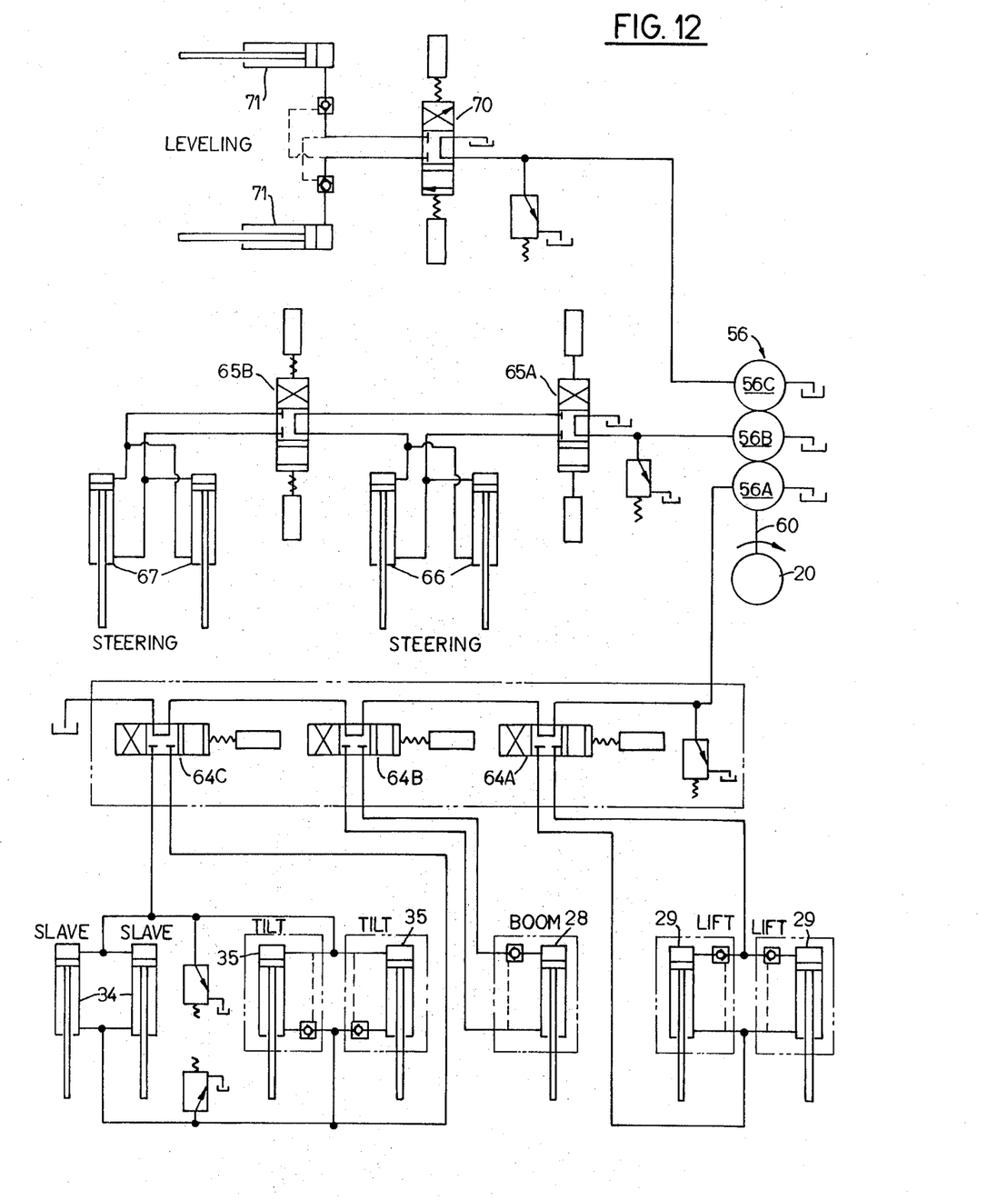
FIG. 12 is a schematic diagram of the hydraulic control circuit for other hydraulically powered components of the vehicle shown in FIG. 1.

Pump 56 is a conventional triple stage hydraulic pump of known type which, as FIG. 12 shows, supplies fluid from stage 56A through control valves 64A, 64B and 64C to operate the boom lift cylinders 29, the boom telescope cylinder 28, and the tilt cylinder 35 and slave cylinder 34 therefor. Stage 56B supplies fluid through control valves 65A and 65B to operate the front and rear steering cylinders 66 and 67, respectively. Stage 56C supplies fluid through a control valve 70 to operate the leveling cylinders 71.

Figure 11:
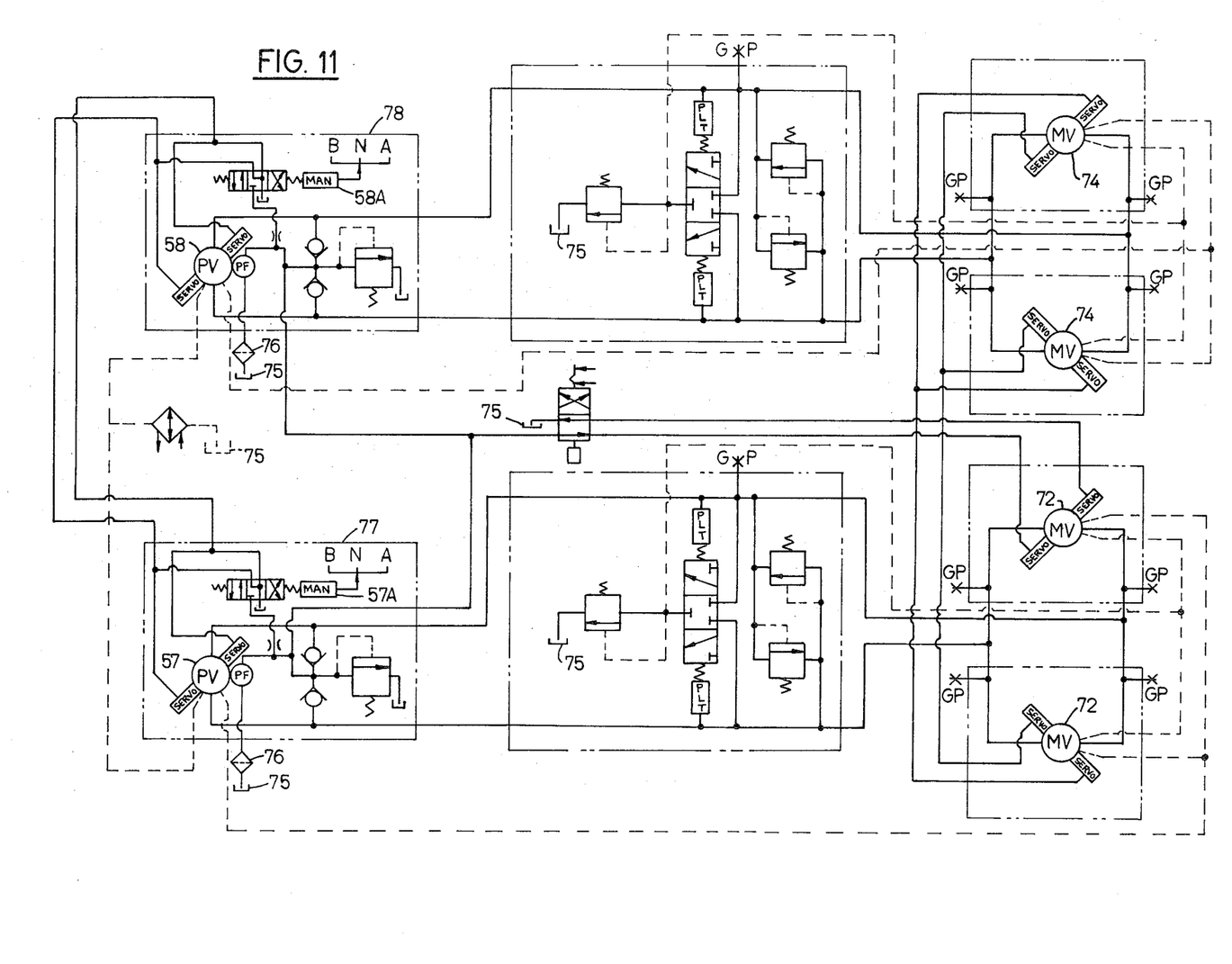
FIG. 11 is a schematic diagram of the hydraulic control circuit for the hydraulically driven ground wheels on the vehicle shown in FIG. 1.

The pumps 57 and 58, best seem in FIGS. 9 and 10, are each variable displacement reversible output hydraulic pumps of a conventional type, such as the Sundstrand Model No. 28 pump described in Bulletin 9630 of the Sundstrand Hydro-Transmission Division of Sundstrand Corporation, Aues, Iowa. The pumps 57 and 58 have pivotably movable swash plate control levers 57A and 58A, respectively, thereon. As FIG. 11 shows, pumps 57 and 58 are connected to supply operating fluid to the two front hydraulic motors 72 for the front wheels 16 and to the two rear hydraulic motors 74 for the rear wheels 18, respectively. Each motor 72 and 74 may be a variable motor, such as the Sundstrand Model No. 28 motor also disclosed in the aforesaid bulletin.

Each pump 57 and 58 and its associated motors 72 and 74, respectively, provide a hydrostatic transmission which offers infinite control of vehicle speed and direction. The operator has complete control of the system with one lever 57A and 58A effecting starting, stopping, forward motion or reverse motion of the wheels driven by that pump. Simultaneous control of the variable displacement, axial pistonpumps 57 and 58 is the key to controlling vehicle 10. Prime mover horsepower from engine 20 is transmitted to the pump. When the operator moves the control levers 57A and 58A, the swash plate in the corresponding pump is tilted from neutral. When the variable pump swash plate (not shown) is tilted, a positive stroke to the pump pistons (not shown) is created. This, in turn, at any given input speed, produces a certain flow from the pump. This flow is transferred through high pressure lines to the motors. The ratio of the volume of flow from the pump to the displacement of the motors will determine the speed of the motor output shafts. Moving the control lever to the opposite side of neutral, the flow from the pump is reversed and the motor output shafts turn in the opposite direction. Speed of the motor output shafts is controlled by adjusting the displacement (flow) of the transmission. Load (working pressure) is determined by the external conditions, (grade, ground conditions, etc.) and this establishes the demand on the system.

As FIG. 11 shows, all valves required for a closed loop circuit are included in either the pump or motor assemblies. A reservoir 75, filter 76, control valves 77 and 78 and interconnecting fluid lines complete the circuit.

PEDAL CONTROLS

As FIG. 2 shows, the throttle pedal 40 and V-shaped or butterfly-shaped shuttle pedal 42 are pivotably mounted on the floorboard 44 of cab 22 so as to be accessible, for example, to the operator's left and right foot, respectively. As FIGS. 3 through 7 shows, the pedals 40 and 42 are supported for pivotal movement on transversely disposed pins 39 and 41, respectively, which are supported on brackets 43 and 45, respectively, which are welded to the floorboard 44. Throttle pedal 40 is depressible downwardly in one direction only about its pin 39, whereas shuttle pedal 42 is depressible or tiltable downwardly in seesaw fashion in two opposite directions about its pin 41, by applying pressure at the opposite right end 42A or left end 42B thereof. Shuttle pedal 42 has a central hub 91 from which a rigidly attached lever arm 90 downwardly depends through a hole 95 in floorboard 44. Lever arm 90 is connected to one end of an axially movable pump control cable 93. The other end of cable 93 is connected to a linkage 100 for operating the pump swash plate control levers 57A and 58A. Cable 93 is movable in a cable housing 94 which has each of its ends secured as at 96 and 97 to stationary brackets on vehicle 10. Movement of the shuttle pedal 42 in either direction effects corresponding movement of the pump swash plates to operate the pumps 57 and 58 simultaneously, as hereinbefore described.

A cylindrical pivot shaft 102 is rotatably mounted beneath the floorboard 44 on two spaced-apart bushings 104 which are supported on two brackets 106. Shaft 102 has a crank or plate 108 rigidly attached at one end thereof. A rod 116 is pivotally connected between a bracket 117 on the bottom of pedal 40 and plate 108. Movement of throttle pedal 40 effects rotary movement of plate 108 and shaft 102. Plate 108 is connected by a rod 112 to one end of an engine throttle crank 110. Crank 110 is pivotally mounted on a shaft 114 which is supported on a stationary portion of vehicle 10. A tension type biasing spring 122 is connected between the other end of lever 110 and a bracket 120 which is rigidly secured to a stationary portion of vehicle 10. Spring 122 acts to bias lever 110, plate 108, shaft 102 and throttle pedal 40 into their normal deactivated positions in readiness for depression of throttle pedal 40. Throttle crank 110 is connected by an axially movable control cable 124 to the throttle lever 51 on engine 20. Thus, depression of throttle pedal 40 effects operation of throttle lever 51 and causes an increase in engine speed. Conversely, release of pressure on throttle pedal 40 allows biasing spring 122 to return throttle lever 51 to idle position and to return the throttle pedal components to the deactuated position hereinbefore described.

The right and left sides of the shuttle pedal 42 are connected by rigid rods 130 and 131, respectively, to right and left pivot assemblies 133 and 134, respectively. The pivot assemblies 133 and 134 comprise hollow cylindrical members 135 and 136, respectively, which are rotatably mounted on shaft 102 on opposite sides of a stop member 138 which is disposed on shaft 102. Stop member 138 comprises a hollow cylindrical portion 140 which is secured against rotation on shaft 102 by a pin 142. Member 140 is provided with a stop member or plate 144 which projects outwardly from a side of the shaft 102. Projection 144 is adapted to be engaged by projections 146 and 147 which are provided on the cylindrical members 135 and 136, respectively. The members 135 and 136 are also provided with outwardly projecting lever arms 150 and 151 and the lower ends of the rods 130 and 131, respectively, are pivotally connected to the lever arms. The upper ends of the rods 130 and 131 are pivotally connected to brackets 154 and 155 on the undersides 42A and 42B, respectively of shuttle pedal 42.

When one side or the other of shuttle pedal 42 is depressed, the associated pivot assembly is rotated on shaft 102 until the plate member thereon engages the stop plate 144, whereupon shaft 102 and crank 108 are rotated to effect operation of the engine throttle lever to cause an increase in engine speed. It is to be noted that depression of either side 42A or 42B of shuttle pedal 42 effects rotation of shaft 102 in the same direction. When downward pressure of either end of shuttle pedal 42 is released the biasing spring 122 causes shaft 102 to rotate to its normal or idle position. As this occurs, stop plate 144 acts upon the plate 146 or 147 or which ever is displaced and causes the cylindrical member 135 or 136 to be rotated to its normal position and such movement causes shuttle pedal 42 to be returned to its centered or normal position. It is to be noted that when shaft 102 is operated by shuttle pedal 42, there is corresponding movement of throttle pedal 40 even though the latter is not being depressed directly by the vehicle operator.

As is apparent pivot shaft 102 rotation by either throttle pedal 40 or shuttle pedal 42 causes corresponding movement of the engine throttle control lever 51 to effect a change in engine speed and a corresponding change in the speed of the pumps driven by the engine. It is to be understood that an increase in engine speed is desired when any of the three engine driven pumps are being called upon to supply operating fluid to their associated hydraulic motors or actuators. This is necessary to provide increased power output from the pumps.

In the embodiment of the engine described herein, two variable displacement type pumps 57 and 58 are provided, one for supplying fluid to the rear wheel motors and the other for supplying fluid to the front wheel motors. As FIG. 9 shows, the pumps are mounted in inverted or upside-down relationship to one another and therefore the operating levers 57A and 58A must be connected by a suitable linkage to effect simultaneous movement of the levers 57A and 58A. As FIGS. 9 and 10 show, the linkage 100 comprises a horizontally disposed rotatable shaft 160 which is mounted in a sleeve 161 which is supported on brackets 162 and 163 on a stationary portion of vehicle 10, such as gear housing. It is to be noted that cable 93 from shuttle pedal 42 is connected to a lever arm 164 which is rigidly attached to rod 160. Another lever arm 165 also rigidly attached to rod 160, is connected by a rod 167 to control member 57A of pump 57. A lever arm 169 is rigidly secured to the opposite end of shaft 160 and the lever 169 is connected by a downwardly extending elongated rod 170 to a bell crank assembly 172 which is connected by a rod 173 to control member 58A from pump 58. Rod 170 is provided with a stop member 175 thereon which is engaged between a pair of biasing springs 176 and 177. The springs 176 and 177 are trapped between the ends of a U-shaped bracket 180 which is rigidly secured as by bolts 181 to a support plate 182 on engine 20. When shaft 160 is rotated by cable 93 in response to operation of shuttle pedal 42, the axial movement of cable 93 is transmitted through linkage 100 to effect simultaneous movement of the pump control members 57A and 58A. When shuttle pedal 42 is returned to neutral, the springs 176 and 177 acting on rod 170 insure that the pump control member 57A and 58A both return to their neutral positions whereby the pumps 57 and 58 provide no fluid output.

An electric switch 200 is mounted on a bracket 201 and is actuated by a switch actuating member 203 rigidly secured to shuttle pedal 42. The purpose of the switch is to prevent engine 20 of vehicle 10 from being started unless shuttle pedal 42 is in neutral position.

I claim:

1. In a self-propelled vehicle:
 ground wheels;
 a hydraulic motor for driving at least one of said ground wheels;
 first hydraulic pump means for supplying fluid to said motor;
 propulsion means for driving said first pump means;
 pump control means for said first pump means and including a first member movable to control the direction and speed of rotation of said motor and of said ground wheels;
 speed control means including a second member movable to regulate the speed of said propulsion means and of said first pump means;
 a shuttle pedal pivotably movable in opposite directions about a first axis to control the direction and speed of rotation of said motor and said ground wheels, said shuttle pedal comprising two portions located on opposite sides of said axis;
 a pump control lever arm connected to and movable with said shuttle pedal;
 means for connecting said pump control lever arm to said first member of said pump control means to effect operation thereof in response to movement of said shuttle pedal;
 a rotatable shaft disposed transverse said first axis;
 a throttle control lever arm connected to and rotatable with said shaft;
 means for connecting said throttle control lever arm to said second member of said speed control means;
 a stop member projecting from the periphery of said shaft;
 a pair of independently movable sleeves rotatably mounted on said shaft on opposite sides of said stop member, each sleeve having a lever arm and a portion engageable with said stop member;
 and means for connecting the lever arm on each sleeve with one of said portions of said shuttle pedal.

2. A vehicle according to claim 1 further comprising at least one component for performing a function on said vehicle; hydraulic actuator means for powering said component; second hydraulic pump means driven by said propulsion means for supplying fluid to said actuator means; a throttle pedal operable independently of said shuttle pedal for regulating the speed of said propulsion means and said first and second hydraulic pump means; and means for connecting said throttle pedal to said throttle control lever arm.

3. A vehicle according to claim 2 wherein said throttle pedal is pivotable about a second axis which is transverse to said first axis, and wherein said first axis is generally parallel to the longitudinal axis of said vehicle.

4. A vehicle according to claim 2 wherein said ground wheels comprise a pair of front wheels and a pair of rear wheels; wherein said first pump means comprises a pair of first pumps; wherein said pump control means for said first pump means comprises a linkage connected to said shuttle pedal for simultaneously operating said pair of first pumps in response to operation of said shuttle pedal.

* * * * *